United States Patent [19]

Mauritz et al.

[11] Patent Number: 4,607,992
[45] Date of Patent: Aug. 26, 1986

[54] EXPANSION DOWEL ASSEMBLY WITH A SPHERICALLY SHAPED SPREADER

[75] Inventors: Bernd Mauritz; Raimer Uhlig, both of Munich, Fed. Rep. of Germany

[73] Assignee: Hilti Aktiengesellschaft, Fürstentum, Liechtenstein

[21] Appl. No.: 656,168

[22] Filed: Sep. 28, 1984

[30] Foreign Application Priority Data

Sep. 30, 1983 [DE] Fed. Rep. of Germany ....... 3335628

[51] Int. Cl.⁴ .................................................. F16B 13/06
[52] U.S. Cl. .................................... 411/45; 411/55; 411/57; 411/537
[58] Field of Search .................................. 411/44–45, 411/54–57, 60–62, 63–68, 537, 538

[56] References Cited

U.S. PATENT DOCUMENTS

| 2,403,541 | 7/1946 | Molat . | |
|---|---|---|---|
| 3,760,802 | 9/1973 | Fischer et al. | 411/55 |
| 4,315,393 | 2/1982 | Schack et al. | 411/908 |
| 4,403,894 | 9/1983 | Clark | 411/44 |

FOREIGN PATENT DOCUMENTS

| 208769 | 12/1955 | Australia | 411/55 |
|---|---|---|---|
| 15313 | 11/1911 | Denmark . | |
| 565353 | 7/1957 | Italy | 411/55 |
| 76812 | 5/1950 | Norway | 411/55 |
| 440854 | 1/1968 | Switzerland | 411/55 |
| 1454945 | 11/1976 | United Kingdom . | |
| 651136 | 3/1979 | U.S.S.R. | 405/259 |
| 0739181 | 6/1980 | U.S.S.R. | 411/378 |

Primary Examiner—Thomas J. Holko
Assistant Examiner—Suzanne L. Dino
Attorney, Agent, or Firm—Toren, McGeady, Stanger, Goldberg & Kiel

[57] ABSTRACT

An expansion dowel assembly includes an axially elongated expansion sleeve with an axially extending expansion region, a spreader positioned within the sleeves in the expansion region, and a bolt in threaded engagement within a tapped bore in the spreader so that the spreader can be displaced axially through the expansion region for widening it in the radial direction. The surface of the spreader in surface contact with the interior of the sleeve is spherically shaped. In the assembled state, before expansion, the spreader is held in the expansion sleeve against axial displacement. Accordingly, the parts of the assembly can be preassembled as a unit.

6 Claims, 3 Drawing Figures

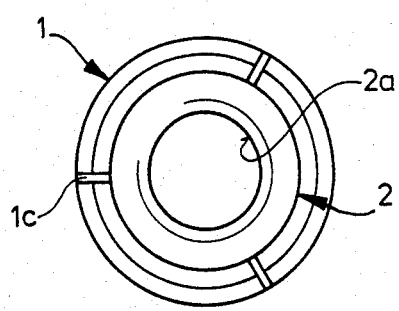
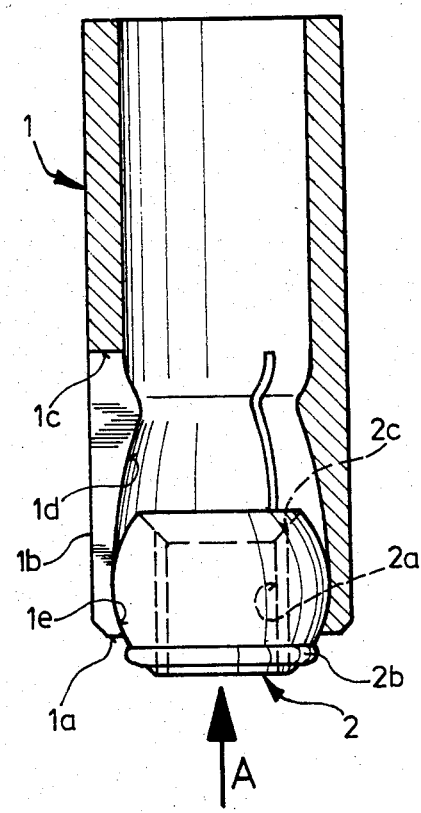
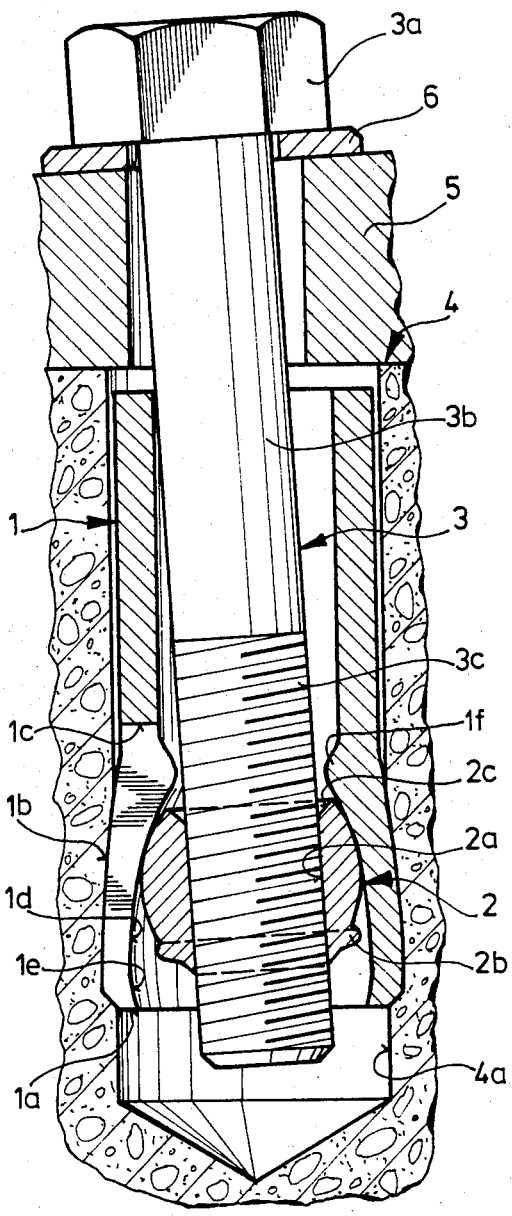

EXPANSION DOWEL ASSEMBLY WITH A SPHERICALLY SHAPED SPREADER

SUMMARY OF THE INVENTION

The present invention is directed to an expansion dowel assembly including a sleeve-like expansion dowel with a slotted axially extending expansion region. The expansion region has a bore with surfaces diverging in the placement direction, that is, toward the leading end of the dowel. A spreader containing a tapped bore is located in the expansion region and is in threaded engagement with a bolt inserted into the tapped bore so that by drawing the spreader toward the trailing end of the dowel the expansion region can be widened radially.

Expansion dowel assemblies of the above type have significant advantages, such as simple assembly and the ability to effect post-spreading. If necessary, such dowel assemblies, once expanded, can be loosened and removed.

In practical applications, it often happens that the surface of a structural part to be attached to a receiving material does not extend exactly perpendicular to the axis of the bore in the receiving material into which the expansion dowel assembly is placed. As a result, the surface of the receiving material and the base of the structural part to be attached may not extend parallel to one another, such as in the attachment of a beam. Further, when the receiving bore is being drilled its axis may not be perpendicular to the surface of the receiving material. In such situations when torque is applied to the threaded bolt in the expansion dowel assembly to develop a prestress, a bending stress occurs due to the eccentricity involved. In an extreme case, due to the bending stress the head may be completely or partially torn off from the shank of the bolt.

Furthermore, an inclined position of the threaded bolt may occur due to deviations in the axial dimensions of the structural part to be secured to the receiving material. If there are more than two fastening locations on a structural part, the use of oblong holes does not help, since such holes only balance out deviations in one direction.

The disadvantages set forth above cannot be avoided with a known expansion dowel assembly where the spreader is constructed as a roller with an axis disposed perpendicularly to the long axis of the dowel assembly. The expansion sleeve or dowel which is used mainly for anchorage in light construction materials, such as aerated concrete and the like, includes an expansion sleeve formed of two shells or parts which can be driven apart by the spreader and develops a form-locking connection due to the displacement relative to the receiving material. The threaded bolt connected with the spreader can be pivoted out of the longitudinal axis within the expansion sleeve only in one plane.

The primary object of the present invention is to provide an expansion dowel assembly which affords a universal adaptation to any uneven areas in the surface of the receiving material or in the structural part to be attached.

In accordance with the present invention, the spreader included in the expansion dowel assembly has a spherically shaped surface in contact with the inside surface of the expansion sleeve.

Because of the spherical shape of the spreader, a ball joint is provided in the expansion sleeve. Such a ball joint permits the threaded bolt to swivel relative to the axis of the bore in which the expansion sleeve is placed, that is, to provide a swivelling action around the center of the spreader.

Under certain conditions, it is possible to insert the preassembled expansion dowel assembly including the expansion sleeve and the spreader through the structural part which is to be secured onto the receiving material. Such an assembly requires a hole through the structural part to be fastened which hole corresponds at least to the outside diameter of the expansion sleeve. In many cases, however, for reasons of strength, such an assembly is not possible and the threaded bolt must be subsequently inserted and screwed into the expansion dowel previously inserted into the borehole in the receiving material. To facilitate the assembly of the parts of the expansion dowel assembly, it is advantageous that the spreader has a circumferential annular bulge, arranged in a plane perpendicular to the axis of its tapped bore, which acts as a stop in combination with the leading end of the expansion sleeve. In place of an interaction between the spreader and the leading end of the expansion sleeve, a special stop may be provided on the expansion sleeve for interaction with the annular bulge.

To facilitate the alignment and meshing of the threads when the threaded bolt is screwed into the spreader, it is advantageous if the trailing end of the tapped bore of the spreader is countersunk. Such a countersunk surface affords a lead-in for the leading end of the bolt into the tapped bore in the spreader. The angle of the countersunk surface relative to the axis of the bore is preferably in the range of 60° to 90°.

To prevent the spreader from falling out of the expansion sleeve during the handling of the expansion dowel assembly, a detachable connection may be provided such as using adhesive, soldering or welding. Such a connection between the spreader and the expansion sleeve may involve special effort to break the connection, such as the application of considerable force for breaking the connection before commencing the expansion operation. A connection which overcomes the disadvantages involved in securing the parts together, in accordance with the present invention, provides a projection on the leading end of the expansion sleeve extending into the cross-section of the bore through the sleeve so that the spreader is secured against any displacement out of the sleeve. The projection can be formed as one or more cams or as a continuous circumferential bulge. As a result, the spreader is held within the expansion sleeve so that it cannot fall out. Such a connection can be easily released, if necessary, for the replacement of the spreader.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 illustrates a part of an expansion dowel assembly in the unspread state and shown partly in section;

FIG. 2 is an end view of the expansion dowel assembly shown in FIG. 1 taken in the direction of the arrow A; and FIG. 3 is an axially extending sectional view of the expansion dowel assembly shown in FIGS. 1 and 2 with the assembly anchored in a receiving material.

DETAILED DESCRIPTION OF THE INVENTION

In FIGS. 1, 2 and 3 an expansion dowel assembly is illustrated including an axially extending expansion sleeve 1 with a spreader 2 located within the sleeve. As viewed in FIGS. 1 and 3, the lower end of the sleeve is its leading end and the upper end is the trailing end. As can be seen in FIG. 3, the leading end is inserted first into the prepared borehole 4a drilled into the surface of the receiving material 4. Expansion sleeve 1 has an axially extending expansion region 1b extending in the axial direction from the leading end 1a of the sleeve. A plurality of axially extending slots 1c are provided in the expansion region 1b with the slots extending from the leading end 1a to a location approximately midway along the sleeve and on the opposite side of the inwardly directed annular protuberance 1f extending inwardly into the bore 1d formed through the sleeve. As can be seen in FIG. 1, the bore 1d through the sleeve is of a uniform diameter from the trailing end to approximately the ends of the slots 1c closer to the trailing end. From the inward ends of the slots 1c, the bore surface projects inwardly to the location of the annular protuberance 1f and then diverges outwardly to a transverse plane close to the leading 1a of the sleeve. The axially extending slots 1c facilitate the radial widening of the expansion region 1b of the sleeve. The spreader 2 has a spherically shaped surface contacting the surface of the bore 1d in the sleeve in the expansion region 1b and the leading and trailing ends of the spreader extend generally perpendicularly of the axis of the sleeve. A continuous tapped bore 2a is located through the spreader extending in the axial direction of the sleeve. At its leading end, the spreader projects outwardly from the leading end 1a of the sleeve and has an annular bulge 2b located in a plane disposed perpendicularly to the axis of the tapped bore 2a. The annular bulge 2b limits any swivelling action of the spreader relative to the sleeve 1. The leading end 1a of the expansion sleeve acts as a stop relative to the annular bulge 2b in the unspread state of the assembly shown in FIG. 1. The trailing end surface of the spreader 2 encircling the tapped bore 2a has a countersunk surface 2c. The countersunk surface 2c aids in centering and facilitating the screwing of the threaded bolt 3 into the spreader 2. To prevent the spreader 2 from falling out of the leading end of the bore 1d which widens toward the leading end 1a, the leading end of the sleeve is provided with an inwardly directed projection 1e. As a consequence, the spreader 2 is secured or locked within the expansion region 1b of the sleeve 1.

As illustrated in FIG. 2, three axially extending slots 1c are formed in the expansion sleeve 1 and are uniformly spaced apart in the circumferential direction of the sleeve. This arrangement of the slots 1c is merely exemplary and more or less slots 1c may be formed in the sleeve.

In FIG. 3, the expansion dowel assembly including the threaded bolt 3 is shown inserted into the blind hole 4a in the receiving material 4. A structural part 5 is secured against the surface of the receiving material by the threaded bolt 3. The outer surface of the structural part 5 is disposed at an oblique angle to the surface of the receiving material, that is, the outer surface is not parallel with the surface of the receiving material. The threaded bolt has a hexagon head 3a located at its trailing end and an axially extending shank 3b extends from the head axially through the structural part 5 and the sleeve 1. The forward part of the bolt 3 has an axially extending threaded section 3c located along the front end of the bolt shank 3b. The threaded bolt 3 extends through a washer 6 bearing against the outside surface of the structural part 5, through the structural part 5 and the expansion sleeve 1 into threaded engagement with the tapped bore 2a in the spreader 2.

As viewed in FIG. 3, when torque is applied to the hexagon head 3a, the bolt is screwed into the tapped bore in the spreader 2 and the spreader is drawn into the expansion sleeve 1 in the direction toward its trailing end and effects a radial widening of the sleeve within the expansion region 1b. Since the surface of the spreader 2, in contact with the surface of the bore 1d in the sleeve, is spherically shaped, a ball type joint is formed between the expansion sleeve and the spreader and affords the inclined position of the threaded bolt 3 relative to the axis of the expansion sleeve. The possible angle of deflection of the threaded bolt 3 relative to the axis of the sleeve 1 depends on the length and the inside diameter of the expansion sleeve. The expansion dowel assembly embodying the present invention can, if necessary, after partial loosening or withdrawal of the threaded bolt 3, be detached from engagement within the blind borehole 4a by applying impacting force against the hexagon head 3a and thereby permitting the assembly to be pulled out of the blind borehole.

Preferably, the expansion dowel assembly embodying the present invention is formed of metal. For small loads however, the spreader 2 and/or the expansion sleeve 1 may be formed of a plastics material.

While specific embodiments of the invention have been shown and described in detail to illustrate the application of the inventive principles, it will be understood that the invention may be embodied otherwise without departing from such principles.

We claim:

1. An expansion dowel assembly comprises an axially elongated expansion sleeve having leading end and a trailing end with the leading end inserted first into a borehole into which said dowel assembly is to to anchored, said sleeve has an expansion region extending from the leading end toward the trailing end for a part of the axial length thereof, a spreader with a tapped bore is located within said expansion sleeve in the expansion region, and a threaded bolt positionable within said expansion sleeve and threadably engageable within the tapped bore in said spreader so that by drawing said spreader through said expansion sleeve toward the trailing end of said sleeve, the expansion region can be radially expanded, wherein the improvement comprises that said spreader has an exterior surface in contact with the interior of said expansion sleeve and the exterior surface of said spreader in contact with said sleeve is spherically shaped, said spreader positioned within said sleeve has a circumferential annular bulge extending outwardly from the exterior surface of said spreader with said bulge located in a plane perpendicular to the axis of said tapped bore within said spreader, and in the position of said spreader within said sleeve the end of said spreader closer to the trailing end of said sleeve is provided with a countersunk surface around said tapped bore.

2. An expansion dowel assembly, as set forth in claim 1 wherein the leading end of said expansion sleeve has a projection extending inwardly into the path of the bore through the sleeve and serving to secure said spreader within said sleeve.

3. An expansion dowel assembly, as set forth in claim 1, wherein said sleeve has a bore extending therethrough, said bore in said expansion region of said sleeve commencing at the end thereof closer to the trailing end of said sleeve converges inwardly and forms an inwardly directed protuberance and then converges outwardly to adjacent the leading end of said sleeve and at the leading end of said sleeve the surface of said bore projects inwardly, and said spherically shaped spreader disposed in contact with the bore in said sleeve between said protuberance and the leading end of said sleeve.

4. An expansion dowel assembly, as set forth in claim 3, wherein in the unexpanded state, the spherically shaped surface of said spreader has a diameter corresponding to the diameter of said bore adjacent the leading end of said sleeve and inwardly of the inwardly projecting end of said bore at the leading end of said sleeve.

5. An expansion dowel assembly, as set forth in claim 4, wherein said inwardly projecting protuberance formed in the bore in said sleeve has a diameter smaller than the diameter of the spherically shaped surface of said spreader.

6. An expansion dowel assembly, as set forth in claim 5, wherein said annular bulge on said spreader has a greater outside diameter than the diameter of the bore in said sleeve at the leading end thereof.

* * * * *